(12) United States Patent
Robrish et al.

(10) Patent No.: US 6,243,065 B1
(45) Date of Patent: Jun. 5, 2001

(54) REFLECTIVE FERROELECTRIC LIQUID CRYSTAL LIGHT VALVE WITH INCREASED LIGHT THROUGHPUT

(75) Inventors: Peter R. Robrish, San Francisco; Andreas Weber, Redwood City, both of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/183,554

(22) Filed: Oct. 29, 1998

(51) Int. Cl.[7] ................................................. G09G 3/36
(52) U.S. Cl. .......................... 345/97; 349/18; 349/290; 359/634
(58) Field of Search ........................ 345/89, 97; 349/18, 349/84, 116, 172, 198; 359/290, 559, 634

(56) References Cited

U.S. PATENT DOCUMENTS

| 5,126,864 | 6/1992 | Akiyama et al. ............ 359/53 |
| 5,381,253 | * 1/1995 | Sharp et al. ............ 359/260 |
| 5,658,490 | 8/1997 | Sharp et al. ............ 252/299.01 |
| 5,748,164 | 5/1998 | Handschy et al. ............ 345/89 |
| 5,872,648 | * 2/1999 | Sanchez et al. ............ 359/290 |
| 6,046,858 | * 4/2000 | Scott et al. ............ 359/634 |

FOREIGN PATENT DOCUMENTS

WO 99/42898  8/1999  (WO) ...................... G02F/1/135

OTHER PUBLICATIONS

McKnight, Douglas J., "Continuous Vlew of dc–Balanced Images on a Ferroelectric Liquid–Crystal Spatial Light Modulator", Opticas Letters, vol. 19, No. 18, Sep. 15, 1994, pp. 1471–1473.

* cited by examiner

Primary Examiner—Amare Mengistu
(74) Attorney, Agent, or Firm—Ian Hardcastle (57) ABSTRACT

A ferroelectric liquid crystal-based light valve comprising a light input, a light output, a polarizing beam splitter, a reflective spatial light modulator and a switchable half-wave plate. Light polarized parallel to a first direction is received through the light input. Light from the light input and reflected by the spatial light modulator is output from the light output. The reflective spatial light modulator is structured as a quarter-wave plate and has a principal axis that switches through an angle $\phi$. The polarizing beam splitter has orthogonal directions of maximum transmissivity and maximum reflectivity, one of which is parallel to the first direction. The polarizing beam splitter is located and aligned relative to the light input, the light output, and the spatial light modulator to transmit or reflect the light from the light input towards the spatial light modulator, and to reflect or transmit, respectively, towards the light output the light reflected by the spatial light modulator and having a direction of polarization substantially orthogonal to the first direction. The switchable half-wave plate is located between the beam splitter and the spatial light modulator, is structured as a half-wave plate and has a principal axis that switches through an angle $\theta$, substantially equal to $\phi/2$. The switchable half-wave plate inverts the sense of the light valve during the balance period of each display period to enable the light valve to generate a positive image, and therefore be illuminated, during the balance period in addition to during the illumination period.

19 Claims, 5 Drawing Sheets

FIG.1A
(PRIOR ART)

(PRIOR ART)

REFLECTIVE FERROELECTRIC LIQUID CRYSTAL LIGHT VALVE WITH INCREASED LIGHT THROUGHPUT

FIELD OF THE INVENTION

The invention relates to reflective ferroelectric liquid crystal-based light valves such as those used in video displays and in particular relates to such light valves having a substantially increased light throughput.

BACKGROUND OF THE INVENTION

A need exists for various types of video and graphics display devices with improved performance and lower cost. For example, a need exists for miniature video and graphics display devices that are small enough to be integrated into a helmet or a pair of glasses so that they can be worn by the user. Such wearable display devices would replace or supplement the conventional displays of computers and other devices. A need also exists for a replacement for the conventional cathode-ray tube used in many display devices including computer monitors, conventional and high-definition television receivers and large-screen displays. Both of these needs can be satisfied by display devices that incorporate a light valve that uses as its light control element a spatial light modulator based on a surface-stabilized ferroelectric liquid crystal (SSFLC) material.

A SSFLC-based spatial light modulator is composed of a layer of a SSFLC material sandwiched between two transparent electrodes. One of the electrodes is segmented into an array of pixel electrodes to define the picture elements (pixels) of the spatial light modulator. The direction of an electric field applied between each pixel electrode and the other electrode determines whether or not the corresponding pixel of the spatial light modulator rotates the direction of polarization of light falling on the pixel. The spatial light modulator is constructed as a half-wave plate and rotates the direction of polarization through 90° so that the polarized light transmitted by the pixels of the spatial light modulator either passes through a polarization analyzer or is absorbed by the polarization analyzer, depending on the direction of the electric field applied to each pixel. The resulting optical characteristics of each pixel of the spatial light modulator are binary: the pixel either transmits light (its 1 state) or absorbs light (its 0 state), and therefore appears light or dark, depending on the direction of the electric field.

To produce the grey scale required for conventional display devices, the apparent brightness of each pixel is varied by temporally modulating the light transmitted by each pixel. The light is modulated by defining a basic time period that will be called the illumination period of the spatial light modulator. The pixel electrode is driven by a drive signal that switches the pixel from its 1 state to its 0 state. The duration of the 1 state relative to the duration of the illumination period determines the apparent brightness of the pixel.

Ferroelectric liquid crystal-based spatial light modulators suffer the disadvantage that, after each time the drive signal has been applied to a pixel electrode to cause the pixel to modulate the light passing through it, the DC balance of the pixel must be restored. This is done by defining a second basic time period called the balance period, equal in duration to the illumination period, and driving the pixel electrode with a complementary drive signal having 1 state and 0 state durations that are complementary to the 1 state and 0 state durations of the drive signal during the illumination period. The illumination period and the balance period collectively constitute a display period. To prevent the complementary drive signal from causing the display device to display a substantially uniform, grey image, the light source illuminating the light valve is modulated so that the light valve is only illuminated during the illumination period, and is not illuminated during the balance period. However, modulating the light source as just described reduces the light throughput of the light valve to about half of that which could be achieved if DC balance restoration were unnecessary. This means that a light source of approximately twice the intensity, with a corresponding increase in cost, is necessary to achieve a given display brightness. Additionally or alternatively, projection optics with a greater aperture, also with a corresponding increase in cost, are necessary to achieve a given brightness.

Recently, a need for reflective light valves based on reflective spatial light modulators has arisen. Reflective spatial light modulators use reflective pixel electrodes and have the advantage that they do not require a transparent substrate. Accordingly, such spatial light modulators can be built on a silicon substrate that also accommodates the drive circuits that derive the drive signals for the pixel electrodes from the input video signal. A reflective light valve has the advantage that its pixel electrode drive circuits do not partially occlude the light modulated by the pixel. This enables a reflective light valve to have a greater light throughput than a similar-sized transmissive light valve and allows larger and more sophisticated drive circuits to be incorporated.

FIG. 1 A shows part of a display device incorporating a conventional reflective light valve 10 that includes the reflective spatial light modulator 25. Other principal components of the light valve are the polarizer 17, the beam splitter 19 and the analyzer 21. The light valve is illuminated with light from the light source 15. The light output by the light valve passes to the output optics 23 that focus the light to form an image (not shown). The light valve, light source and output optics may be incorporated into various types of display device, including miniature, wearable devices, cathode-ray tube replacements, and projection displays.

Figure 1A:
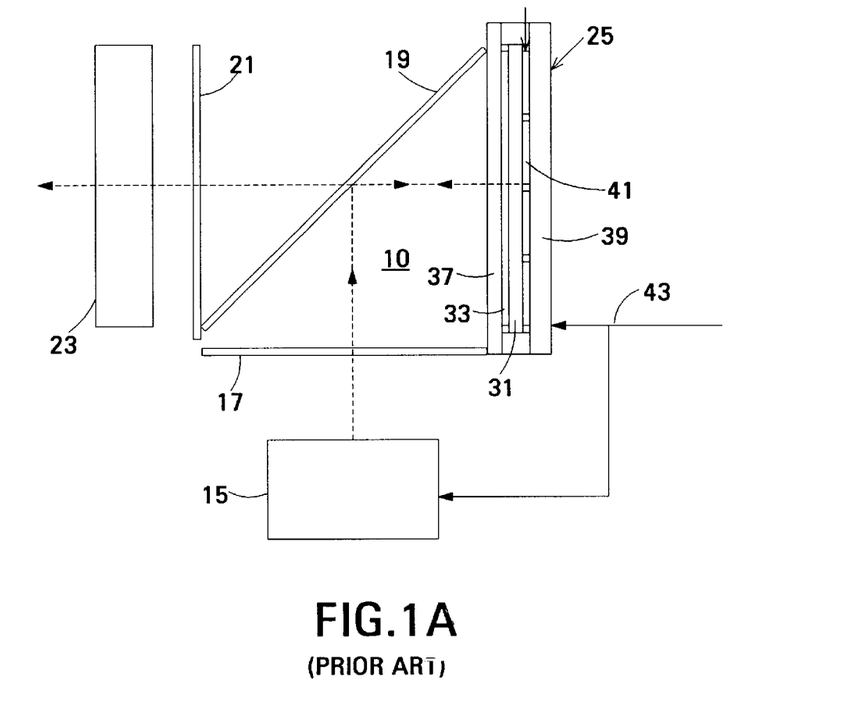
FIG. 1A is a schematic diagram of part of a display device incorporating a conventional reflective light valve.

Light generated by the light source 15 passes through the polarizer 17. The polarizer polarizes the light output from the light source. The beam splitter 19 reflects a fraction of the polarized light output from the polarizer towards the spatial light modulator 25. The spatial light modulator is divided into a two-dimensional array of picture elements (pixels) that define the spatial resolution of the light valve. The beam splitter transmits a fraction of the light reflected by the spatial light modulator to the analyzer 21.

The direction of an electric field in each pixel of the spatial light modulator 25 determines whether or not the direction of polarization of the light reflected by the pixel is rotated by 90° relative to the direction of polarization of the incident light. The light reflected by each pixel of the spatial light modulator passes through the beam splitter 19 and the analyzer 21 and is output from the light valve depending on whether or not its direction of polarization was rotated by the spatial light modulator. The light output from the light valve 10 passes to the output optics 23.

The light source 15 may be composed of LEDs. The LEDs are of three different colors in a color display. Other light-emitting devices whose output can be rapidly modulated may alternatively be used as the light source 15. As a further alternative, a white light source and a light modulator (not shown) may be used. The light modulator modulates the amplitude of the light generated by the light source to define the illumination period and balance period of the spatial light modulator. In a light valve for use in a color display device, the light modulator additionally modulates the color of the light output from the light source.

The polarizer 17 polarizes the light generated by the light source 15. The polarization is preferably linear polarization. The beam splitter 19 reflects the polarized light output from the polarizer towards the spatial light modulator 25, and transmits to the analyzer 21 the polarized light reflected by the spatial light modulator. The direction of maximum transmission of the analyzer is orthogonal to that of the polarizer in this example.

The spatial light modulator 25 is composed of the transparent electrode 33 deposited on the surface of the transparent cover 37, the reflective electrode 35 located on the surface of the semiconductor substrate 39, and the surface-stabilized ferroelectric liquid crystal (SSFLC) layer 31 sandwiched between the transparent electrode and the reflective electrode. The reflective electrode is divided into a two-dimensional array of pixel electrodes that define the pixels of the spatial light modulator and of the light valve. A substantially reduced number of pixel electrodes is shown to simplify the drawing. For example, in a light valve for use in a large-screen computer monitor, the reflective electrode could be divided into a two-dimensional array of 1600×1200 pixel electrodes. An exemplary pixel electrode is shown at 41. Each pixel electrode reflects the portion of the incident polarized light that falls on it towards the beam splitter 19.

A drive circuit (not shown), which may be located in the semiconductor substrate 39, applies a drive signal to the pixel electrode of each pixel of the spatial light modulator 25. The drive signal has two different voltage levels, and the transparent electrode 33 is maintained at a fixed potential mid-way between the voltage levels of the drive signal. The potential difference between the pixel electrode and the transparent electrode establishes an electric field across the part of the liquid crystal layer 31 between the pixel and transparent electrodes. The direction of the electric field determines whether the liquid crystal layer rotates the direction of polarization of the light reflected by the pixel electrode, or leaves the direction of polarization unchanged.

The reflective spatial light modulator 25 is structured as a quarter-wave plate in contrast to a transmissive spatial light modulator, which is structured as a half-wave plate. This difference arises because light passes through the reflective spatial light modulator twice, once before and once after reflection by the reflective pixel electrodes. The thickness of the layer of ferroelectric liquid crystal material in the liquid crystal layer 31 is chosen to provide an optical phase shift of 90° between light polarized parallel to the director of the liquid crystal material and light polarized perpendicular to the director. The liquid crystal material is preferably a Smectic C* ferroelectric liquid crystal material having an angle of 22.5° between its director and the normal to its smectic layers. Reversing the direction of the electric field applied to such a liquid crystal material switches the director of the material through an angle of about 45°. Consequently, if the director is aligned parallel to the direction of maximum transmission of the analyzer 21 with one polarity of the electric field, reversing the direction of the electric field will rotate the direction of polarization of light reflected by the pixel through 90°. This will align the direction of polarization of the light perpendicular to the direction of maximum transmission of the analyzer, and will change the pixel from its 1 state, in which the pixel appears bright, to its 0 state, in which the pixel appears dark.

In a miniature, wearable display, the output optics 23 are composed of an eyepiece that receives the light reflected by the reflective electrode 35 and forms a virtual image at a predetermined distance in front of the user (not shown). In a cathode-ray tube replacement or in a projection display, the output optics are composed of projection optics that focus an image of the reflective electrode on a transmissive or reflective screen (not shown). Optical arrangements suitable for use as an eyepiece or projection optics are well known in the art and will not be described here.

Since the direction of maximum transmission of the analyzer 21 is orthogonal to the direction of polarization defined by the polarizer 17, light whose direction of polarization has been rotated through 90° by a pixel of the spatial light modulator 25 will pass through the analyzer and be output from the light valve 10 whereas light whose direction of polarization has not been rotated will not pass through the analyzer. The analyzer only transmits to the output optics 23 light whose direction of polarization has been rotated by pixels of the spatial light modulator. The pixels of the spatial light modulator will appear bright or dark depending on the direction of the electric field applied to each pixel. When a pixel appears bright, it will be said to be in its 1 state, and when the pixel appears dark, it will be said to be in its 0 state.

The direction of maximum transmission of the analyzer 21 can alternatively be arranged parallel to that of the polarizer 17, and a non-polarizing beam splitter can be used as the beam splitter 19. In this case, the spatial light modulator 25 operates in the opposite sense to that just described.

To produce the grey scale required by a display device notwithstanding the binary optical characteristics of the pixels of the light valve 10, the apparent brightness of each pixel is varied by temporally modulating the light reflected by the pixel, as described above. The drive circuit (not shown) for each pixel of the spatial light modulator determines the duration of the 1 state of the pixel in response to a portion of the input video signal 43 corresponding to the location of the pixel in the spatial light modulator.

Figure 1B:
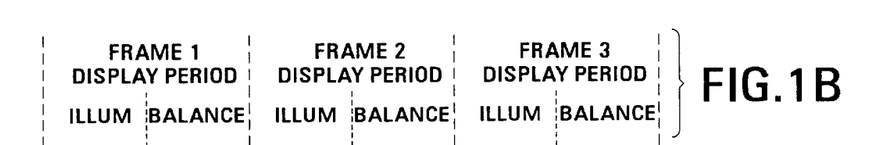
FIGS. 1B–1F illustrate the operation of the conventional reflective light valve shown in FIG. 1A.

FIGS. 1B–1F illustrate the operation of the exemplary pixel 41 of the conventional light valve 10 shown in FIG. 1A during three consecutive display periods. The remaining pixels operate similarly. In one embodiment of a conventional light valve, each display period corresponded to one frame of the input video signal 43. In another embodiment, each display period corresponded to a fraction of one frame of the input video signal. Each display period is composed of an illumination period (ILLUM) and a balance period (BALANCE) having equal durations, as shown in FIG. 1B.

Figure 1C:
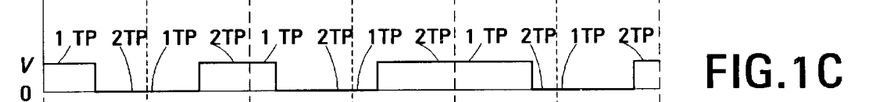

FIG. 1C shows the drive signal applied to the exemplary pixel electrode 41. The transparent electrode 33 is held at a voltage level of V/2, so that changing the voltage level on the pixel electrode from 0 to V reverses the direction of the electric field applied to the ferroelectric liquid crystal layer 31. The level of the drive signal is V for a first temporal portion 1 TP of each illumination period. The level of the drive signal is 0 for the second temporal portion 2TP constituting the remainder of the illumination period, and also for the first temporal portion 1TP of the subsequent balance period. The first temporal portion of the balance period has a duration equal to the first temporal portion of the illumination period. However, the level of the drive signal is 0 during the first temporal portion of the balance period, whereas the level of the drive signal is V during the first temporal portion of the illumination period. Finally, the level of the drive signal changes to V for the second temporal portion 2TP constituting the remainder of the balance period. Consequently, during the balance period, the level of the drive signal is 0 and V for times equal to the times that it was at V and 0, respectively, during the illumination period. As a result, the electric field applied to the liquid crystal material of the pixel averages to zero over the display period.

In the example shown, the duration of the first temporal portion 1TP of the drive signal is different in each of the three illumination periods. The duration of the first temporal portion, and, hence, of the second temporal portion, of each illumination period depends on the voltage level of the corresponding sample of the input video signal 43.

Figure 1D:
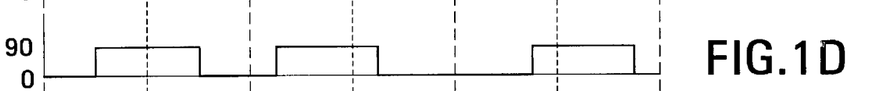

FIG. 1D shows the effect of the spatial light modulator 25 on the direction of polarization of the light impinging on the analyzer 21. The direction of polarization is indicated by the absolute value of the angle a between direction of polarization of the light impinging on the analyzer and the direction of maximum transmissivity of the analyzer. The analyzer transmits light having an angle α close to zero and absorbs light having an angle α close to 90°. In each display period, the angle a has values corresponding to the pixel being bright and dark for equal times due to the need to restore the DC balance of the pixel.

Figure 1E:
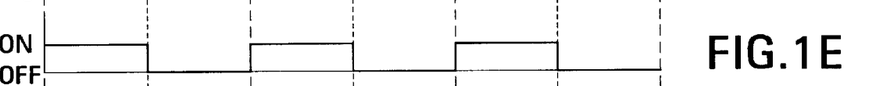

FIG. 1E shows the modulation of the light source 15. The light source is ON throughout the illumination period of each display period, and is OFF during the following balance period.

Figure 1F:
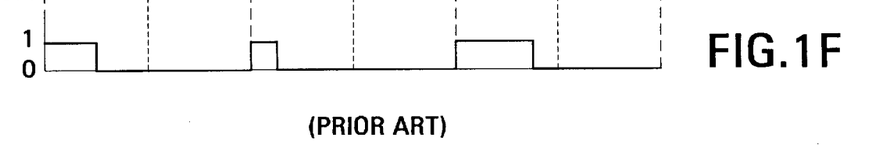

FIG. 1F shows the light output from the exemplary pixel of the light valve 10 controlled by the pixel electrode 41. Light is output from the pixel only during the first temporal portion of the illumination period of each display period. No light is output during the second temporal portion of the illumination period. Moreover, no light is output during the balance period of the display period because the light source 15 is OFF during the balance period. The light source being OFF for half the display period substantially reduces the perceived maximum brightness of the pixel, and of any image generated by a display device incorporating such a conventional light valve.

The need to maintain the DC balance of the ferroelectric liquid crystal material of the spatial light modulator 25 means that the reflective light valve just described suffers from a similar light throughput problem to the transmissive light valves described above. Consequently, what is needed is a reflective ferroelectric liquid crystal-based light valve that can remain illuminated during the balance period so that the light throughput of the light valve can be approximately twice that of a conventional light valve.

SUMMARY OF THE INVENTION

The invention provides a ferroelectric liquid crystal-based light valve that comprises a light input, a light output, a polarizing beam splitter, a reflective spatial light modulator and a switchable half-wave plate. Light having a direction of polarization parallel to a first direction is received through the light input. The light received at the light input is output from the light output after reflection by the spatial light modulator. The reflective spatial light modulator is structured as a quarter-wave plate and has a principal axis that switches through an angle of rotation $\phi$. The polarizing beam splitter has orthogonal directions of maximum transmissivity and maximum reflectivity. One of the directions is parallel to the first direction. The polarizing beam splitter is located and aligned relative to the light input, the light output, and the spatial light modulator to reflect or transmit the light received at the light input towards the spatial light modulator, and to transmit or reflect, respectively, towards the light output the light reflected by the spatial light modulator and having a direction of polarization substantially orthogonal to the first direction. The switchable half-wave plate is located between the polarizing beam splitter and the reflective spatial light modulator, is structured as a half-wave plate and has a principal axis that switches through an angle of rotation $\theta$ substantially equal to $\phi/2$.

The switchable half-wave plate may include a pair of opposed transparent electrodes and a layer of liquid crystal material sandwiched between the electrodes. The liquid crystal material may be a ferroelectric liquid crystal material or a nematic liquid crystal material. Alternatively, the direction of the principal axis of the switchable half-wave plate may be mechanically switched.

The invention also provides a method of increasing the light throughput of a reflective light valve that requires DC balancing. In the method, a reflective light valve that includes a reflective spatial light modulator and a polarizing beam splitter is provided. The polarizing beam splitter has orthogonal directions of maximum transmissivity and maximum reflectivity, one of which defines the direction of polarization of light incident on the reflective spatial light modulator, the other of which defines the direction of polarization of light output from the light valve. The spatial light modulator has a principal axis switchable between a first direction and a second direction. The second direction is at an angle $\phi$ to the first direction. Also provided is a switchable half-wave plate that has a principal axis switchable between a third direction and a fourth direction. The fourth direction is at an angle $\theta$ to the third direction.

The switchable half-wave plate is inserted into the light valve between the polarizing beam splitter and the reflective spatial light modulator with the third direction aligned parallel to the first direction. The spatial light modulator is operated in a first time period and a second time period equal to the first time period with its principal axis in the first direction for a portion of the first time period, in the second direction for the remainder of the first time period and a portion of the second time period, and in the first direction for the remainder of the second time period. The portion of the second time period is equal in duration to the portion of the first time period, and the portion of the second time period and the remainder of the second time period are in any temporal order. The switchable half-wave plate is operated with its principal axis in the third direction through the first period and in the fourth direction through the second period, and with the angle $\theta$ substantially equal to $\phi/2$.

A switchable half-wave plate may be provided in which the principal axis switches between the third direction and the fourth direction in a switching time, and the method may additionally comprise illuminating the light valve with light, and reducing the intensity of the light during the switching time of the switchable half-wave plate.

Switching the switchable half-wave plate inverts the sense of the light valve relative to the direction of the electric field applied to the liquid crystal material of the spatial light modulator. When the first time period and the second time period correspond to the illumination period and the balance period of a display period, inverting the sense of the light valve during the balance period enables a display device incorporating the light valve to generate a positive image in both the illumination period and the balance period of the display period. Accordingly, the light valve can be illuminated during both the illumination period and the balance period. This almost doubles the light throughput of the light valve according to the invention compared with a conventional light valve.

DETAILED DESCRIPTION OF THE INVENTION

Figure 2A:
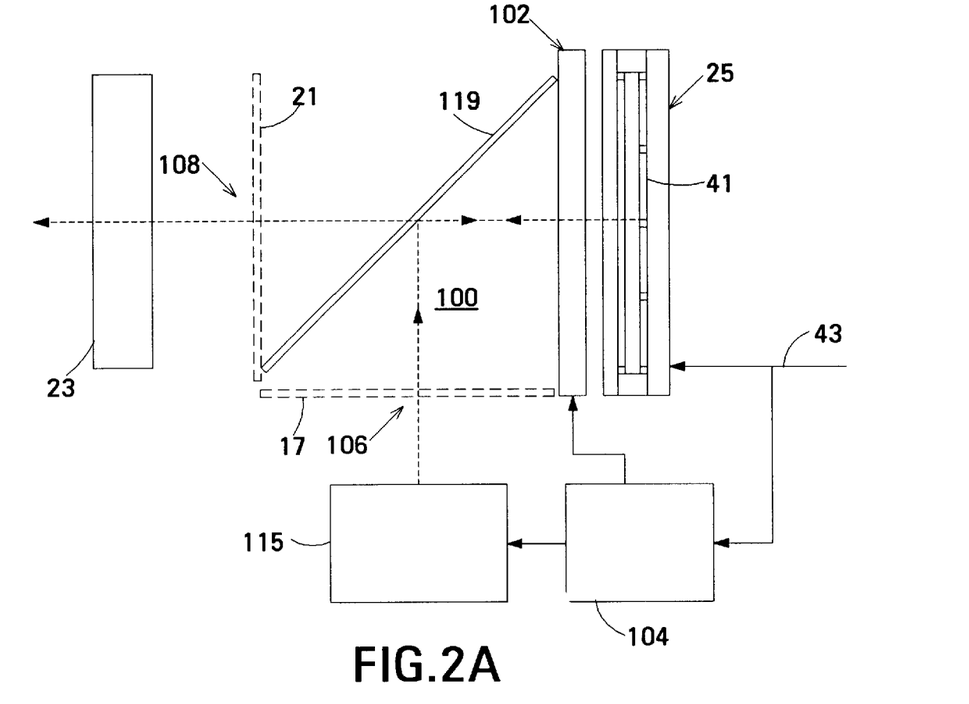
FIG. 2A is a schematic diagram of part of a display device incorporating a reflective light valve according to the invention.

FIG. 2A is a schematic diagram showing part of a display device incorporating the reflective light valve 100 according to the invention. The light valve can be incorporated into various types of display device, including miniature, wearable devices, cathode-ray tube replacements, and projection displays. The light valve 100 can be illuminated continuously or almost continuously, which enables a display device incorporating the light valve according to the invention to have a maximum brightness of approximately twice that obtained using a conventional light valve. Elements of the light valve shown in FIG. 2A that are identical to elements of the conventional light valve shown in FIG. 1A are indicated by the same reference numerals and will not be described again here.

The display device is composed of the light valve 100 having a light input 106 arranged to receive polarized light generated by the polarized light source 115, and a light output 108 from which spatially-modulated light is output to the output optics 23. The light valve additionally includes the polarizing beam splitter 119, the spatial light modulator 25 and the switchable half-wave plate 102. The switchable half-wave plate is located between the polarizing beam splitter and the spatial light modulator.

The polarized light source 115 generates polarized light. The light valve 100 receives the light generated by the polarized light source at the light input 106. Light passes from the light input to the polarizing beam splitter 119. The polarizing beam splitter has a direction of maximum reflectivity, and a direction of maximum transmissivity substantially orthogonal to the direction of maximum reflectivity. The polarized light source is aligned so that the direction of the polarized light generated by the polarized light source is parallel to the direction of maximum reflectivity of the polarizing beam splitter. The polarizing beam splitter reflects the polarized light generated by the polarized light source towards the spatial light modulator 25. The polarizing beam splitter also transmits the light reflected by the spatial light modulator to the light output 108 when the direction of polarization of the reflected light is parallel to its direction of maximum transmissivity.

Alternatively, the positions of the light input 106 and the light output 108 can be interchanged and the positions of the polarized light source 115 and the output optics 23 can be interchanged. Then, the polarizing beam splitter 119 can transmit the polarized light generated by the light source to the spatial light modulator 25, and can reflect towards the light output the light reflected by the spatial light modulator when the direction of polarization of the reflected light is parallel to its direction of maximum reflectivity.

If the light output from the light source 115 is not strongly polarized, the light valve 100 may additionally include the polarizer 17. The polarizer is located between the light input 106 and the polarizing beam splitter 119. The polarizer defines the direction of polarization of the light controlled by the light valve and should be oriented with its direction of polarization parallel to the direction of maximum reflectivity of the polarizing beam splitter. Additionally or alternatively, if the angular discrimination of the transmissivity of the polarizing beam splitter is insufficient to provide a desired contrast in images generated by a display device incorporating the light valve 100, the light valve may include the analyzer 21. The analyzer is located between the polarizing beam splitter and the light output 108. References in this disclosure to a polarizing beam splitter will be understood to encompass a polarizing beam splitter alone, a polarizing beam splitter in combination with a polarizer or an analyzer or a polarizer and an analyzer, and a non-polarizing beam splitter in combination with a polarizer and an analyzer.

In the light valve 100, the switchable half-wave plate 102 is located between the polarizing beam splitter 119 and the spatial light modulator 25. The switchable half-wave plate operates synchronously with the illumination and balance periods of the spatial light modulator to invert the sense of the light valve relative to the direction of the electric field applied to the liquid crystal material of the spatial light modulator during the balance period of each display period. Inverting the sense of the light valve during the balance period of the display period enables a display device incorporating the light valve to generate a positive image in both the illumination period and the balance period of the display period. Accordingly, the light valve can be illuminated during both the illumination period and the balance period. This almost doubles the light throughput of the light valve 100 compared with the conventional light valve 10 shown in FIG. 1A.

To invert the sense of the light valve 100 relative to the direction of the electric field applied to the liquid crystal material of the spatial light modulator 25 during the balance period of each display period, the direction of the principal axis of the switchable half-wave plate 102 is switched electrically, magnetically, mechanically or otherwise between two states. In the first of the two states, the 0 state, the switchable half-wave plate leaves the sense of operation of the light valve relative to the direction of the electric field applied to the liquid crystal material of the spatial light modulator 25 unchanged. In this state, the direction of the principal axis of the switchable half-wave plate is preferably aligned parallel to the direction of polarization of the light output from the polarized light source 115. This corresponds to the direction of maximum reflectivity of the polarizing beam splitter 119. The direction of the principal axis may alternatively be aligned at an angle that is any integral multiple of 90° to the direction of polarization of the light generated by the polarized light source. In the second of the two states, the 1 state, the switchable half-wave plate inverts the sense of operation of the light valve relative to the direction of the electric field applied to the liquid crystal material of the spatial light modulator. In this state, the direction of the principal axis of the switchable half-wave plate is at a non-zero angle θ relative to the direction of the principal axis in the 0 state.

The angle θ through which the principal axis of the switchable half-wave plate 102 switches should be equal to one-half of the actual angle φ through which the principal axis of the spatial light modulator 25 switches, i.e., θ=φ/2. Nominally, the principal axis of the spatial light modulator switches through an angle of 45°, which rotates the direction of polarization of the light reflected towards the polarizing beam splitter 119 by 90°. In this case, the value of θ should be 22.5°, or any odd integral multiple of 22.5°. However, if the principal axis of the spatial light modulator actually switches through 44°, for example, which rotates the direction of polarization of the light reflected towards the beam splitter by 88°, the value of θ should be 22.0°.

A difference between the angle θ through which the principal axis of the switchable half-wave plate 102 switches and one-half of the actual angle φ through which the principal axis of the spatial light modulator 25 switches reduces the contrast of the light valve 100. The contrast of the light valve is the ratio between the light output by the light valve with its pixels in their 1 state and that output by the light valve with its pixels in their 0 state. The reduction in contrast is mainly due to an increase in the light output by the light valve with its pixels in their 0 state. The maximum allowable difference between θ and φ/2 depends on the contrast required of the light valve, with a small difference being required for high contrast. For example, a difference between θ and φ/2 of less than about ±3.5° is required to provide a contrast of 10:1, and a difference of less than about ±1.5° is required to provide a contrast of 100:1.

FIG. 2A shows the switchable half-wave plate 102 operating in response to a control signal generated by the control circuit 104. The control circuit generates the control signal with two states corresponding to the two states of the switchable half-wave plate. During the illumination period of each display period, the control signal is in a state that sets the switchable half-wave plate to its 0 state. In the 0 state of the switchable half-wave plate, the direction of the principal axis of the switchable half-wave plate is parallel to the direction of polarization of the light reflected by the polarizing beam splitter 119. During the balance period of each display period, the control signal is in a state that sets the switchable half-wave plate to its 1 state. In the 1 state of the switchable half-wave plate, the direction of the principal axis of the switchable half-wave plate is at the angle θ relative to the direction of the principal axis in the 0 state.

The control circuit 104 is additionally shown as generating a second control signal that controls the polarized light source 115 to modulate the intensity of the light generated by the light source. The intensity of the light is preferably modulated because currently-available embodiments of the switchable half-wave plate 102 do not switch instantaneously between their respective 0 and 1 states. Illuminating the light valve 100 during the time that the switchable half-wave plate changes state reduces the contrast performance of the light valve. To prevent this problem, the light source is modulated so that it is switched OFF, or its intensity is substantially reduced, each time the state of the switchable half-wave plate is changed. The OFF time corresponds to the time required for the state of the switchable half-wave plate to change.

The control circuit 104 is shown as generating the control signals in response to the input video signal 43. The control circuit could alternatively generate the control signals in response to a synchronizing signal generated from the input video signal by the spatial light modulator 25. As a further alternative, the switchable half-wave plate 102 and the polarized light source 115 can be controlled by control signals generated by the spatial light modulator. In this case, a separate control circuit would not be required. Circuit arrangements that can generate suitable control signals for controlling the switchable half-wave plate and the polarized light source in response to an input video signal or other synchronizing signal are known in the art and will not be described here.

The practical embodiment to be described below with reference to FIG. 4 incorporates a switchable half-wave plate based on a ferroelectric liquid crystal. In this embodiment, the OFF time of the polarized light source 115 was 0.1 ms, and the illumination period and the balance period were each 3.3 ms. Thus, in this embodiment, modulating the light source as just described reduces the light throughput by only a few per cent.

In display devices in which simplicity is of paramount importance, and reduced contrast is acceptable, the polarized light source 115 can remain ON continuously. Reduced contrast is acceptable, for example, in displays that operate in high ambient light levels. Moreover, it may be possible for the light source to remain ON continuously if the switching times of the switchable half-wave plate and the spatial light modulator are short compared with the illumination and balance periods.

Figure 2B:
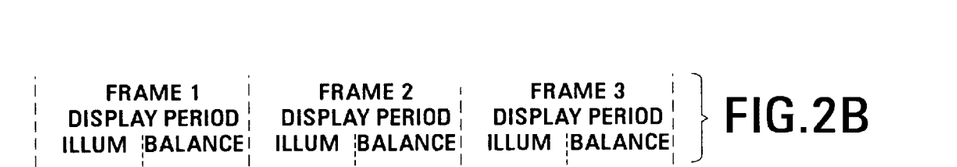
FIGS. 2B–2G illustrate the operation of the reflective light valve according to the invention shown in FIG. 2A.
Figure 2C:
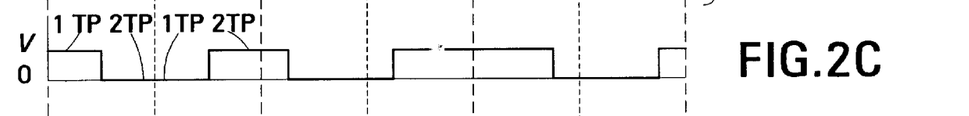

FIGS. 2B–2H illustrate the operation of the exemplary pixel controlled by the pixel electrode 41 in the light valve 100 shown in FIG. 2A during three exemplary frames of the input video signal 43. The pixels controlled by the remaining pixel electrodes operate similarly. Each of the display periods corresponds to one frame of the input video signal and is composed of an illumination period (ILLUM) and a balance period (BALANCE) having equal durations, as shown in FIG. 2B. FIG. 2C shows the drive signal applied to the pixel electrode 41. The drive signal is the same as that described above with reference to FIG. 1D and will not be described again here, except to note that, during the balance period, the level of the drive signal is 0 and V for times equal to the times that it was at V and 0, respectively, during the illumination period, so that the electric field applied to the liquid crystal material of the pixel averages to zero over the display period.

Figure 2D:
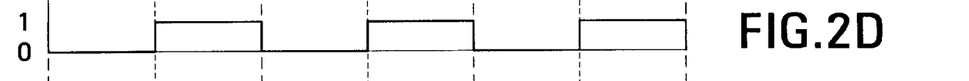

FIG. 2D shows the state of the switchable half-wave plate 102. In the 0 state, the direction of the principal axis of the switchable half-wave plate is aligned parallel to the direction of polarization of the incident light generated by the polarized light source 115. This corresponds to the direction of maximum reflectivity of the polarizing beam splitter 119. As a result, the direction of polarization of the light generated by the light source remains unchanged after passing though the switchable half-wave plate in its 0 state. Thus, when the light that has passed through the switchable half-wave plate in its 0 state impinges on the spatial light modulator 25, its direction of polarization is parallel to the principal axis of the spatial light modulator when the spatial light modulator is in its 0 state, and is at an angle of φ=20 to the principal axis of the spatial light modulator when the spatial light modulator is in its 1 state.

In the 1 state of the switchable half-wave plate 102, the direction of the principal axis is at the non-zero angle θ to the direction of polarization of the incident light. The value of θ is discussed above. As a result, the direction of polarization of the light from the polarized light source 115 is rotated through an angle of 2θ by passing though the switchable half-wave plate in this state. Thus, when the light that has passed through the switchable half-wave plate in its 1 state impinges on the spatial light modulator 25, its direction of polarization is at an angle of φ=2θ to the principal axis of the spatial light modulator when the spatial light modulator is in its 0 state, and is parallel to the principal axis of the spatial light modulator when the spatial light modulator is in its 1 state.

Figure 2E:
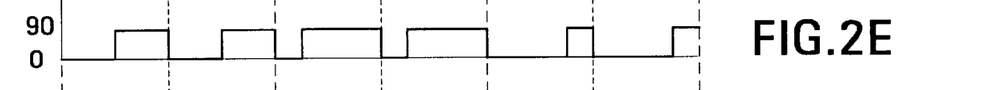

FIG. 2E shows the combined effect of the spatial light modulator 25 and the switchable half-wave plate 102 on the direction of polarization of the light impinging on the polarizing beam splitter 119 after passing through the switchable half-wave plate 102. The direction of polarization is indicated by the absolute value of the angle α between direction of polarization of the light impinging on the polarizing beam splitter and the direction of maximum transmissivity of the polarizing beam splitter. The polarizing beam splitter transmits light having an angle a close to zero and reflects light having an angle α close to 90°. In this Figure, the polarized light source 115 is unmodulated to show the timing of the changes in the direction of polarization of the light impinging on the polarizing beam splitter.

In contrast to FIG. 1D, the direction of polarization of the light impinging on the polarizing beam splitter 119 is the same during the first temporal portions 1 TP of both the illumination period and the balance period and is the same during the second temporal portions 2 TP of both the illumination period and the balance period. Consequently, switching the switchable half-wave plate to its 0 state during the illumination period and to its 1 state during the balance period of each display period inverts the sense of the light valve 100 relative to the direction of the electric field applied to the liquid crystal material of the spatial light modulator 25. This causes the light valve to operate in the same sense during both the illumination and balance periods of the display period. Consequently, the light valve can be illuminated during both the illumination and balance periods of each display period, and a display device incorporating the light valve generates a positive image in both the illumination and balance periods of the display period.

Figure 2F:
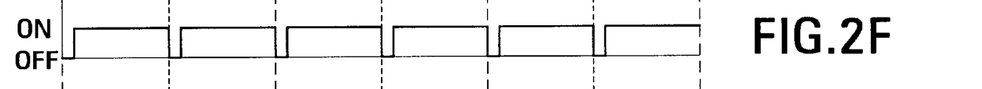

FIG. 2F shows the modulation of the light generated by the polarized light source 115. The light source is ON throughout most the illumination period and most of the balance period of each display period, and is OFF only during the brief periods during which the switchable half-wave plate 102 is changing state.

Figure 2G:
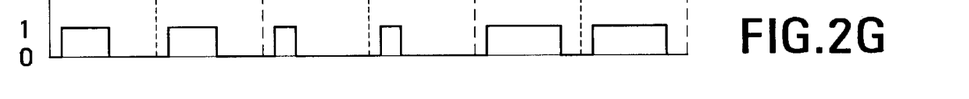

FIG. 2G shows the light output from the light valve 100. In this Figure, the polarized light source 115 is modulated as shown in FIG. 2F. The durations of the temporal portions of both the illumination period and the balance period of each display period during which light is output are the same. Since the polarized light source 115 is modulated as shown in FIG. 2F, the light valve is not illuminated during the switching transients of the switchable half-wave plate 102.

FIGS. 3A–3E illustrate the actions of the switchable half-wave plate 102 and the spatial light modulator 25 on the direction of polarization of light passing through the light valve 100 at four different points along the optical path of the light valve and in the four possible combinations of the 0 and 1 states of the switchable half-wave plate and the spatial light modulator. The points along the optical path are marked A–D in the exploded view of the light valve shown in FIG. 3A. The points are the point A, where the polarized light received at the light input 106 enters the switchable half-wave plate 102 after reflection by the polarizing beam splitter 119; the point B, where the light transmitted through the switchable half-wave plate enters the spatial light modulator; the point C where the light reflected by the spatial light modulator enters the switchable half-wave plate; and the point marked D where the light transmitted by the switchable half-wave plate enters the polarizing beam splitter 1 19.

Figure 3A:
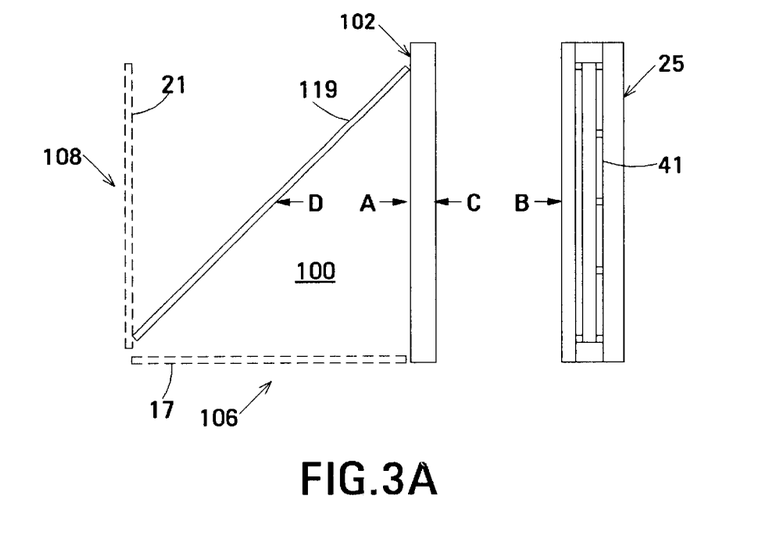
FIG. 3A is an exploded view of a reflective light valve according to the invention.

In the example shown, in the 0 states of the switchable half-wave plate 102 and the spatial light modulator 25, the principal axes 110 and 114 of these elements are both aligned parallel to the direction of maximum reflectivity of the polarizing beam splitter 119, which corresponds to the direction of polarization of the light received at the light input. Moreover, the principal axis 110 of the switchable half-wave plate rotates through an angle of 22.5° and the principal axis 114 of the spatial light modulator rotates through an angle of 45° between the 0 state and the 1 state of these elements.

Figure 3B:
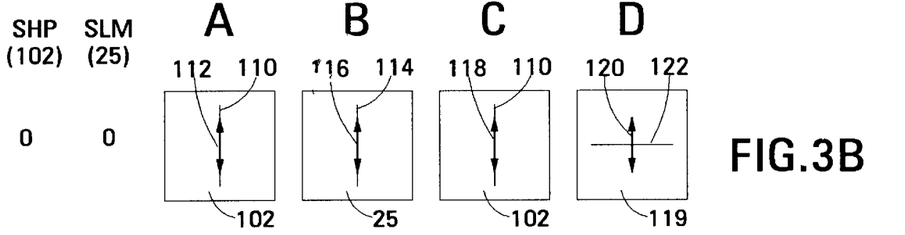
FIGS. 3B–3E show the relationship between the direction of polarization of the light at the points A–D shown in FIG. 3A and the elements of the reflective light valve shown in FIG. 3A.

FIG. 3B shows the actions of the switchable half-wave plate 102 and the spatial light modulator 25 when both are in their 0 states. In this state, the principal axes 110 and 114 of the switchable half-wave plate 102 and the spatial light modulator 25, respectively, are both parallel to the direction of maximum reflectivity of the polarizing beam splitter 119. Consequently, the direction of polarization 112 of the light received at the light input 106 and reflected by the polarizing beam splitter is parallel to the principal axis 110 of the switchable half-wave plate in its 0 state, as shown at A. The switchable half-wave plate therefore transmits the light received at the light input without changing the direction of polarization of this light.

The direction of polarization 116 of the light transmitted by the switchable half-wave plate 102 is parallel to the principal axis 114 of the spatial light modulator 25 in its 0 state, as shown at B. The spatial light modulator therefore reflects the light transmitted by the switchable half-wave plate without changing the direction of polarization of this light.

The direction of polarization 118 of the light reflected by the spatial light modulator 25 is parallel to the principal axis 110 of the switchable half-wave plate 102 in its 0 state, as shown at C. The switchable half-wave plate therefore transmits the light reflected by the spatial light modulator without changing the direction of polarization of this light.

The direction of polarization 120 of the light transmitted by the switchable half-wave plate 102 is orthogonal to the direction of maximum transmissivity 122 of the polarizing beam splitter 119, as shown at D. The beam splitter reflects the light transmitted by the switchable half-wave plate away from the light output 108, so that the pixel controlled by the pixel electrode 41 appears dark.

Figure 3C:
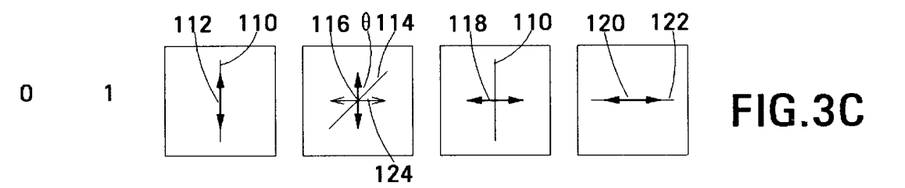

FIG. 3C shows the actions of the switchable half-wave plate 102 and the spatial light modulator 25 when the switchable half-wave plate is in its 0 state and the spatial light modulator is in its 1 state. In this state, the principal axis 110 of the switchable half-wave plate 102 is parallel to, and the principal axis of the spatial light modulator 25 is at an angle of φ=45° to the direction of maximum reflectivity of the polarizing beam splitter 119. Consequently, the direction of polarization 112 of the light received at the light input 106 and reflected by the polarizing beam splitter is parallel to the principal axis 110 of the switchable half-wave plate in its 0 state, as shown at A. The switchable half-wave plate therefore transmits the light received at the light input without changing the direction of polarization of this light.

The direction of polarization 116 of the light transmitted by the switchable half-wave plate 102 is at an angle of θ=45° to the principal axis 114 of the spatial light modulator 25 in its 1 state, as shown at B. The spatial light modulator therefore rotates the direction of polarization of the light transmitted by the switchable half-wave plate through 90° when it reflects this light. The direction of polarization of the light at B after reflection is indicated at 124.

The direction of polarization 118 of the light reflected by the spatial light modulator 25 is at an angle of 90° to the principal axis 110 of the switchable half-wave plate 102 in its 0 state, as shown at C. The switchable half-wave plate therefore leaves the direction of polarization of the light reflected by the spatial light modulator unchanged when it transmits this light.

The direction of polarization 120 of the light transmitted by the switchable half-wave wave plate 102 is parallel to the direction of maximum transmissivity 122 of the polarizing beam splitter 119, as shown at D. The beam splitter therefore transmits the light transmitted by the switchable half-wave plate to the light output 108, and the pixel controlled by the pixel electrode 41 appears bright.

Figure 3D:
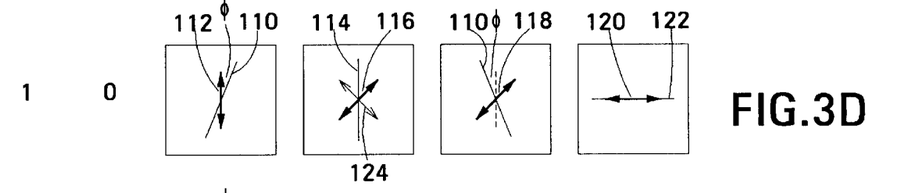

FIG. 3D shows the actions of the switchable half-wave plate 102 and the spatial light modulator 25 when the switchable half-wave plate is in its 1 state and the spatial light modulator is in its 0 state. In this state, the principal axis 110 of the switchable half-wave plate 102 is at an angle of θ=22.5° to, and the principal axis of the spatial light modulator 25 is parallel to the direction of maximum reflectivity of the polarizing beam splitter 119. Consequently, the direction of polarization 112 of the light received at the light input 106 and reflected by the polarizing beam splitter is at an angle of φ=22.5° to the principal axis 110 of the switchable half-wave plate in its 1 state, as shown at A. The switchable half-wave plate therefore rotates the direction of polarization of the light received at the light input through 45° when it transmits this light.

The direction of polarization 116 of the light transmitted by the switchable half-wave plate 102 is aligned at an angle of 45° to the principal axis 114 of the spatial light modulator 25 in its 0 state, as shown at B. The spatial light modulator therefore rotates the direction of polarization of the light transmitted by the switchable half-wave plate through 90° when it reflects this light. The direction of polarization of the light at B after reflection is indicated at 124.

The direction of polarization 118 of the light reflected by the spatial light modulator 25 is at an angle of 67.5° to the principal axis 110 of the switchable half-wave plate 102 in its 1 state, as shown at C. The direction of polarization shown at 118 is the mirror image of the direction of polarization shown at 124 because the view in C is in the opposite direction to the view in B. The switchable half-wave plate therefore rotates the direction of polarization of the light reflected by the spatial light modulator though 135° when it transmits this light.

The direction of polarization 120 of the light transmitted by the switchable half-wave plate 102 is parallel to the direction of maximum transmissivity 122 of the polarizing beam splitter 119, as shown at D. The beam splitter therefore transmits the light transmitted by the switchable half-wave plate to the light output 108, and the pixel controlled by the pixel electrode 41 appears bright.

Figure 3E:
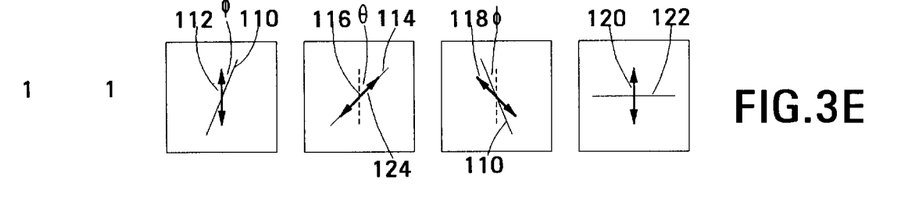

FIG. 3E shows the actions of the switchable half-wave plate 102 and the spatial light modulator 25 when both are in their 1 states. In this state, the principal axis of the switchable half-wave plate 102 is at an angle of θ=22.5° to, and the principal axis of the spatial light modulator 25 is at an angle of φ=45° to the direction of maximum reflectivity of the polarizing beam splitter 119. Consequently, the direction of polarization 112 of the light received at the light input 106 and reflected by the polarizing beam splitter 119 is at an angle of 22.5° to the principal axis 110 of the switchable half-wave plate in its 1 state, as shown at A. The switchable half-wave plate therefore rotates the direction of polarization of the light received at the light input through 45° when it transmits this light.

The direction of polarization 116 of the light transmitted by the switchable half-wave plate 102 is parallel to the principal axis 114 of the spatial light modulator 25 in its 1 state, as shown at B. The spatial light modulator therefore reflects the light transmitted by the switchable half-wave plate without changing the direction of polarization of this light. The direction of polarization of the light at B after reflection is indicated at 124, which coincides in direction with 116.

The direction of polarization 118 of the light reflected by the spatial light modulator 25 is at an angle of 22.5° to the principal axis 110 of the switchable half-wave plate 102 in its 1 state, as shown at C. The direction of polarization shown at 118 is the mirror image of the direction of polarization shown at 124 because the view in C is in the opposite direction to the view in B. The switchable half-wave plate therefore rotates the direction of polarization of the light reflected by the spatial light modulator though 45° when it transmits this light.

The direction of polarization 120 of the light transmitted by the switchable half-wave plate 102 is orthogonal to the direction of maximum transmissivity 122 of the polarizing beam splitter 119, as shown at D. The beam splitter therefore reflects the light transmitted by the switchable half-wave plate away from the light output 108, so that the pixel controlled by the pixel electrode 41 appears dark.

It can be seen by comparing FIGS. 3B and 3D that, when the spatial light modulator 25 is in its 0 state, the direction of polarization of the light impinging on the polarizing beam splitter 119 is orthogonal to (pixel dark) and parallel to (pixel bright) the direction of maximum transmissivity 122 when the switchable half-wave plate is in its 0 state and in its 1 state, respectively. Similarly, it can be seen by comparing FIGS. 3C and 3E that, when the spatial light modulator is in its 1 state, the direction of polarization of the light impinging on the polarizing beam splitter is parallel to (pixel bright) and orthogonal to (pixel dark) the direction of maximum transmissivity when the switchable half-wave plate is in its 0 state and in its 1 state, respectively. The duration of the 1 state of the spatial light modulator during the illumination period is the same as the duration of the 0 state during the following balance period. However, changing the state of the switchable half-wave plate between the illumination period and the balance period inverts the sense of the light valve 100 relative to the direction of the electric field applied to the liquid crystal material of the spatial light modulator 25. Consequently, the direction of polarization of the light incident on the polarizing beam splitter is at the same angle relative to the direction of maximum transmissivity during the same temporal portion of both the illumination period and the balance period.

Figure 4:
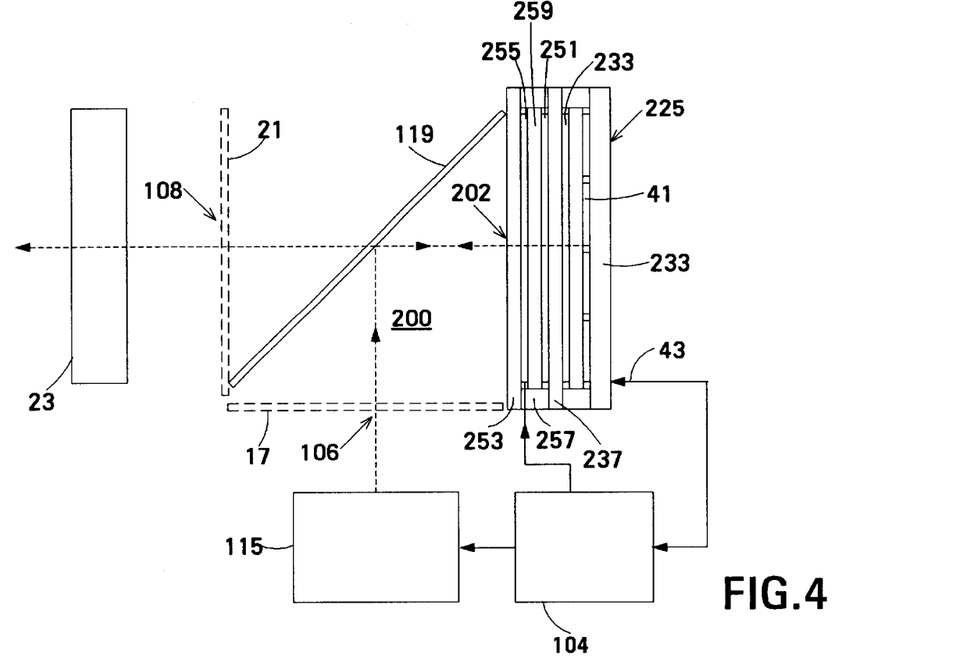
FIG. 4 is a side view of part of a display device incorporating an embodiment of a reflective light valve according to the invention having an electrically-operated switchable half-wave plate.

FIG. 4 shows an embodiment 200 of a light valve according to the invention in which the state of the switchable half-wave plate is switched electrically. The light valve is shown constituting part of a display device. In this embodiment, the switchable half-wave plate 202 is based on a layer of a liquid crystal material sandwiched between two transparent electrodes, and is built on the transparent cover of the spatial light modulator 225. Elements of the embodiment shown in FIG. 4 that correspond to the embodiment shown in FIG. 2 are indicated using the same reference numerals, and will not be described again here.

In the light valve 200, spatial light modulator 225 includes the first transparent cover 237 that supports the transparent electrodes 233 and 251 on its opposed major surfaces. The transparent electrode 233 is the transparent electrode of the spatial light modulator. The transparent electrode 251 is one of the transparent electrodes of the switchable half-wave plate 202. The switchable half-wave plate additionally includes the second transparent cover 253 that supports the transparent electrode 255. The spacer 257 separates the transparent covers 237 and 253 from one another. The layer of liquid crystal material 259 is sandwiched between the transparent electrodes 251 and 255.

The control circuit 104 generates a control signal that has two voltage states 0 and $V_2$. In response to the video input signal 43, the control circuit generates the control signal in its 0 state during the illumination period and in its $V_2$ state during the balance period of each display period. The control signal generated by the control circuit is connected to the transparent electrode 255. The transparent electrode 251 is connected to a constant voltage source (not shown) generating a voltage of $V_2/2$. If the value of $V_2$ is the same as V, the voltage that drives the pixel electrodes of the spatial light modulator 225, the transparent electrodes 251 and 255 may be connected to the same constant voltage source.

The liquid crystal layer 259 may be a layer of a surface-stabilized ferroelectric liquid crystal (SSFLC) material oriented with its principal axis parallel to the direction of maximum reflectivity of the polarizing beam splitter 119. For example, the SSFLC material may be a Smectic C* ferroelectric liquid crystal material having an angle of 11.25° between its director and the normal to its smectic layers. Reversing the direction of the electric field applied to this liquid crystal material switches the director of the material through 22.5°. A Smectic C* ferroelectric liquid crystal material having an angle of 11.25° between its director and the normal to its smectic layers is not commonly available, but can be custom manufactured by suppliers of liquid crystal materials. Alternatively, a commonly-available Smectic C* ferroelectric liquid crystal material having an angle of 22.5° between its director and the normal to its smectic layers at temperatures within a normal operating temperature range can be given an angle of 11.25° between its director and the normal to its smectic layers by operating the liquid crystal material at the appropriate temperature outside its normal operating temperature range.

The thickness of the liquid crystal layer 259 is defined by the spacing between the transparent electrodes 251 and 255. This spacing is set to a distance equal to $\lambda/(2\Delta n)$, where $\lambda$ is a wavelength in the middle of the visible range (550 nm in this example), and $\Delta n$ is the difference between the fast and slow refractive indices of the SSFLC material. A layer of this thickness generates a phase shift of 90° at the design wavelength $\lambda$, and phase shifts close to 90° at other wavelengths.

Alternatively, the SSFLC material of the liquid crystal layer 259 may be a Smectic A*-type liquid crystal material. With this material as the liquid crystal layer, and the transparent electrode 251 is connected to ground (zero V). The angle through which the principal axis of such materials rotates in response to an electric field depends on the voltage applied between the electrodes 251 and 255. This enables the value of θ, the angle of rotation of the principal axis of the switchable half-wave plate 202, to be set to exactly one-half of the actual angle of rotation φ of the principal axis of the spatial light modulator 225. This can be done by making an appropriate choice of the voltage V applied to the transparent electrode 255 in the 1 state of the switchable half-wave plate.

FIG. 4 shows the transparent electrode 251 supported by the same transparent cover plate 237 as the transparent electrode 233 of the spatial light modulator 225. However, this is not critical. The switchable half-wave plate 202 and the spatial light modulator 225 may be constructed as independent components. In this case, a third transparent cover plate is provided, and each of the transparent electrodes 233, 251 and 255 is supported by a different transparent cover plate. It is preferable to coat at least the transparent cover plates supporting the transparent electrodes 237 and 251 with a layer of an anti-reflective material to prevent multiple reflections between adjacent cover plates.

Other forms of electrically-operated switchable half-wave plates may be used. For example, the switchable half-wave plate may be formed of an electro-optic material to which a voltage is applied to change the birefringence of the optical material during the balance period of each display period.

Figure 5:
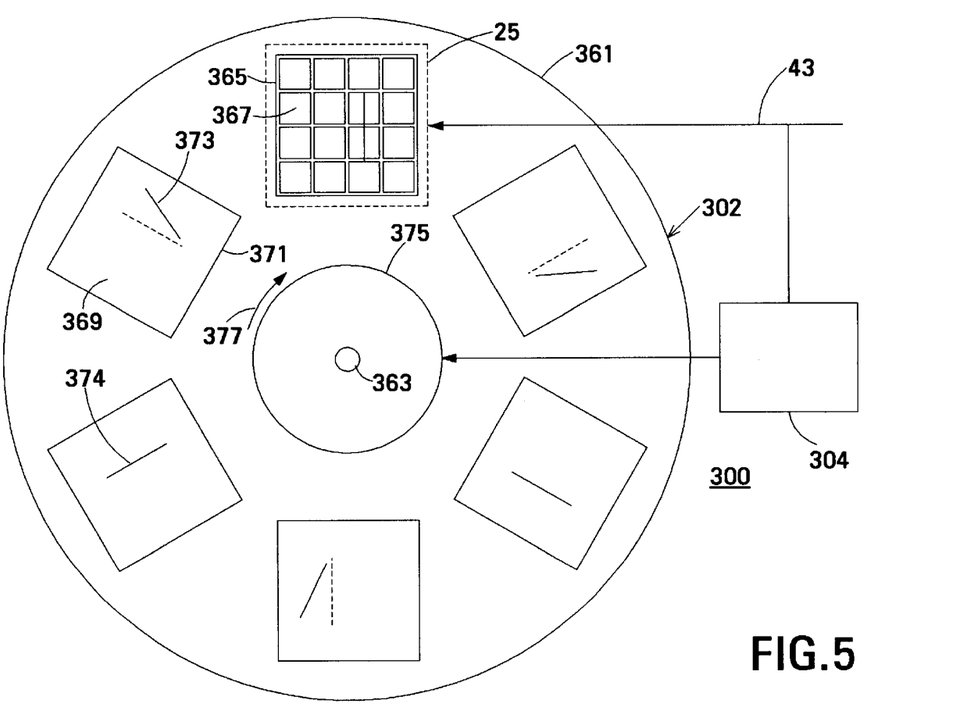
FIG. 5 is a front view of part of an embodiment of a reflective light valve according to the invention having a mechanically-operated switchable half-wave plate.

Finally, the switchable half-wave plate 102 can be switched mechanically. For example, FIG. 5 shows part of an embodiment 300 of the light valve according to the invention that includes an example of a mechanically-operated switchable half-wave plate 302. The wheel 361 is rotatably mounted on the pivot 363 between the polarizing beam splitter 119 (FIG. 3) and the spatial light modulator 25. Formed at regular angular intervals in the wheel are windows having dimensions slightly larger than the active area of the spatial light modulator. An exemplary window is shown at 365. The wheel is positioned so that the windows sequentially expose the active area 367 of the spatial light modulator as the wheel rotates.

Conventional half-wave plates are mounted in each of the windows. The exemplary half-wave plate 369 is shown mounted in the window 371. Each alternate half-wave plate is oriented so that, when the window in which the half-wave plate is mounted is aligned with the spatial light modulator 25, the principal axis 373 of the half-wave plate is at the angle θ to the direction of polarization of the light received at the light input 106 (FIG. 3), and is also at the angle θ to the direction of maximum reflectivity of the polarizing beam splitter 119. Each remaining half-wave plate is oriented so that, when the window in which the half-wave plate is mounted is aligned with the spatial light modulator, the principal axis of the half-wave plate is parallel to the direction of polarization of the light received at the light input 106 (FIG. 3) and to the direction of maximum reflectivity of the polarizing beam splitter. The half-wave plates whose principal axes are parallel to the direction of polarization of the light generated by the polarized light source may be omitted.

The wheel 361 is rotationally stepped by the stepper motor 375 in response to a control signal generated by the controller 304. Control circuits capable of deriving a suitable control signal from the input video signal 43, or from a synchronizing signal are known in the art and will therefore not be described here. The motor rotates the wheel in steps and is stationary throughout the times the polarized light source (not shown) illuminates the light valve. FIG. 5 shows the position of the wheel during the illumination period of an arbitrary display period. In this, the active area 367 of the spatial light modulator 25 is exposed to light transmitted by the half-wave plate mounted in the window 365. Since the principal axis of the half-wave plate mounted in the window 365 is parallel to the directions of polarization of the light received at the light input 106 and the light reflected by the spatial light modulator, the switchable half-wave plate 302 in the position shown does not change the direction of polarization light transmitted through it to the spatial light modulator 25.

During the period of no illumination between the illumination period and the subsequent balance period, the stepper motor 375 steps the wheel 302 through 60° in the direction of the arrow 377 so that the active area 367 of the spatial light modulator 25 is exposed through the window 371 during the balance period. The half-wave plate 369 mounted in the window 371 causes the switchable half-wave plate 302 to rotate the direction of polarization of light passing through it to the spatial light modulator 25 and after reflection by the spatial light modulator. As a result, the switchable half-wave plate 302 inverts the sense of the light valve 300 relative to the direction of the electric field applied to the liquid crystal material of the spatial light modulator 25, as described above.

Alternatively, only the windows 365 and 371 may be formed in the wheel 361 or some other suitably-shaped movable structure. Half-wave plates are mounted in the windows, one with its principal axis parallel to the direction of polarization of the light generated by the light source, and one with its principal axis at an angle of θ to the direction of polarization of the light generated by the light source. In this case, the motor 375 steps the wheel in the direction indicated by the arrow 377 between the illumination period and balance period of a given display period, and then steps the wheel in the opposite direction between the balance period of the display period and the illumination period of the next display period. The half-wave plate with its principal axis parallel to the direction of polarization of the light generated by the polarized light source may optionally be omitted, as described above.

In a light valve for a color display, in which the polarized light source (not shown) sequentially illuminates the light valve 300 with light of three different colors, the three half-wave plates whose principal axes are at an angle of θ to the direction of polarization of the light generated by the polarized light source preferably have different thicknesses and the stepping of the wheel 361 is synchronized with the color of the light generated by the light source so that light of a given color always passes though the same one of the half-wave plates. The switchable half-wave plate 302 then provides a phase shift of exactly 180° for each of the colors of light generated by the light source. This maximizes the contrast provided by the light valve 300 at all three colors of light generated by the light source.

As just mentioned, the contrast of the light valve according to the invention is maximized when the switchable half-wave plate is structured as a half-wave plate that provides a phase shift of exactly 180°. In the practical embodiment of the light valve shown in FIG. 4, the switchable half-wave plate 202 provides a phase shift of exactly 180° at only one wavelength, called the design wavelength. In a color display, the design wavelength normally corresponds to the wavelength of the green light generated by the polarized light source 115. At the wavelengths of the red and blue light generated by the light source, the phase shift generated by the switchable half-wave plate is usually different from the required 180°. As a result, the contrast is usually less when the light valve is illuminated with red light or blue light than it is when illuminated with green light.

Figure 6:
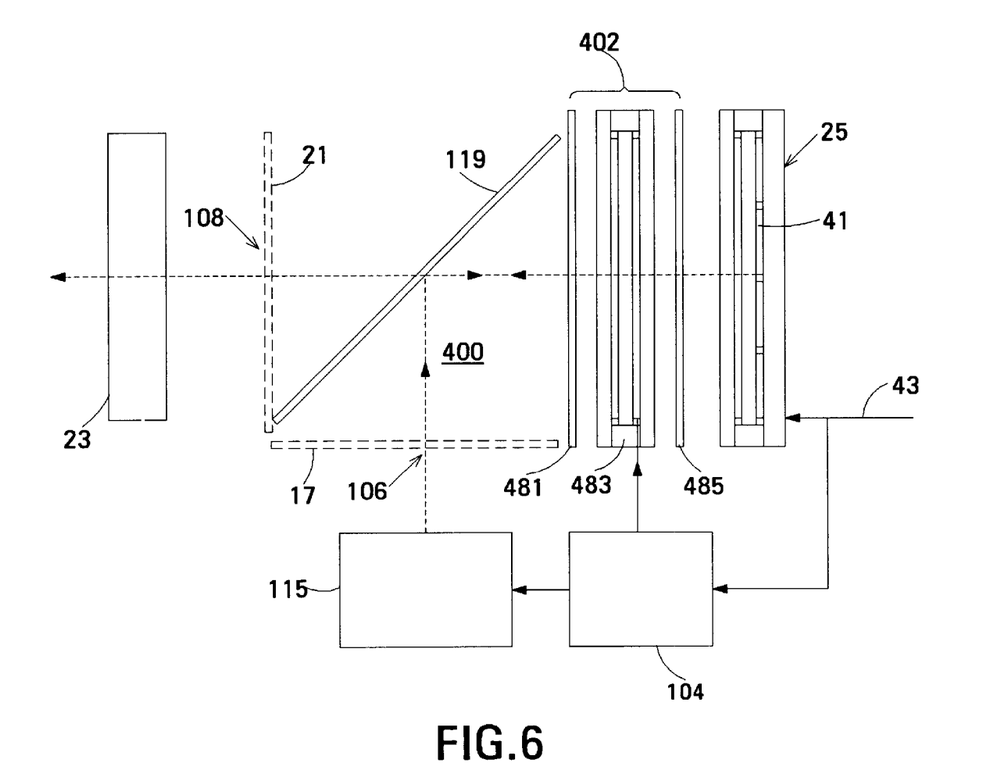
FIG. 6 is a side view of part of a display device incorporating an embodiment of a light valve according to the invention having an electrically-operated achromatic switchable half-wave plate.

FIG. 6 shows an embodiment of the light valve according to the invention in which the achromatic switchable half-wave plate 402 provides the same phase shift at all three illumination wavelengths. Elements of the embodiment shown in FIG. 6 that correspond to elements of the embodiments shown in FIGS. 2A and 4 are indicated using the same reference numerals and will not be described again here.

In the light valve 400 shown in FIG. 6, during each balance period, the achromatic switchable half-wave plate 402 inverts the sense of the light valve relative to the direction of the electric field applied to the liquid crystal material of the spatial light modulator 25. A suitable achromatic switchable half-wave plate is described by Sharp et al. in U.S. Pat. No. 5,658,490, the entire disclosure of which is incorporated into this disclosure by reference. Alternatively, other types of achromatic switchable half-wave plate may be used as the achromatic switchable half-wave plate instead of the example shown.

In the example shown in FIG. 6, the achromatic switchable half-wave plate 402 is composed of the fixed quarter-wave plate 481, the switched half-wave plate 483 and the fixed quarter-wave plate 485 arranged in series along the optical path between the polarizing beam splitter 119 and the spatial light modulator 25.

The fixed quarter-wave plates 481 and 485 can be made from any suitable birefringent material such as quartz, mica, stretched films of such polymers as polyesters or polycarbonates, polymer liquid crystal films, or other suitable materials. The fixed quarter-wave plates should each have a thickness that provides a phase shift of 90° at the above-described design wavelength.

The structure of the switched half-wave plate 483 is similar to that of the switchable half-wave plate 202 described above with reference to FIG. 4. However, the switched half-wave plate 483 includes the transparent cover plate 487 and therefore shares no common elements with the spatial light modulator 25.

FIG. 6 shows the fixed quarter-wave plates 481 and 485, the switched half-wave plate 483 and the spatial light modulator 25 as separate elements. However, in a practical embodiment, the elements are attached to one-another with an index-matching cement to provide structural integrity and to reduce optical losses.

The switchable half-wave plate of the embodiment shown in FIG. 5 may be made achromatic as described in the description of that Figure, or by substituting a three-component achromatic half-wave plate similar to that described above with reference to FIG. 6 for each of the half-wave plates mounted in the wheel 361. In lieu of the switched half-wave plate 483 described above with reference to FIG. 6, each three-component achromatic half-wave plate would incorporate a fixed half-wave plate having a thickness that provides a phase shift of exactly 180° at the design wavelength.

The invention has been described with reference to an example in which the directions of polarization of the polarizer and analyzer are orthogonal to one another. However, this is not critical to the invention; the sense of the spatial light modulator may be reversed, and the directions of polarization of the polarizer and the analyzer may be parallel to one another. However, this requires that the beam splitter be a non-polarizing beam splitter.

The invention has been described with reference to examples in which the polarizing beam splitter reflects the light generated by the polarizing light source and transmits the light reflected by the reflective spatial light modulator. However, this is not critical to the invention; the positions of the light input and the light output can be interchanged, the positions of the polarized light source and the output optics can be interchanged, and the polarizing beam splitter can transmit the light generated by the polarizing light source and can reflect the light reflected by the reflective spatial light modulator. In this case, references in this disclosure to the direction of maximum reflectivity of the polarizing beam splitter become references to the direction of maximum transmissivity and references to the direction of maximum transmissivity of the polarizing beam splitter become references to the direction of maximum reflectivity.

The invention has been described with reference to examples in which the pixels of the light valve are bright during the first temporal portions of the illumination period and of the balance period, and are dark during the second temporal portions of the illumination period and the balance period. However, this is not critical to the invention; the pixels of the light valve may be bright during the second temporal portions, in which case they are dark during the first temporal portions. As a further alternative, if the first temporal portion precedes the second temporal portion of the illumination period, the first temporal portion may follow the second temporal portion of the balance period.

Although this disclosure describes illustrative embodiments of the invention in detail, it is to be understood that the invention is not limited to the precise embodiments described, and that various modifications may be practiced within the scope of the invention defined by the appended claims.

We claim:

1. A ferroelectric liquid crystal-based light valve, comprising:
    a light input through which is received light having a direction of polarization parallel to a first direction;
    a reflective spatial light modulator structured as a quarter-wave plate and having a principal axis that switches through an angle of rotation $\phi$;
    a light output through which the light received at the light input is output after reflection by the spatial light modulator;
    a polarizing beam splitter having orthogonal directions of maximum transmissivity and maximum reflectivity, one of the directions being parallel to the first direction, the polarizing beam splitter being located and aligned relative to the light input, the light output, and the spatial light modulator to reflect or transmit the light received at the light input towards the spatial light modulator, and to transmit or reflect towards the light output the light reflected by the spatial light modulator and having a direction of polarization substantially orthogonal to the first direction; and
    a switchable half-wave plate located between the polarizing beam splitter and the reflective spatial light modulator, the switchable half-wave plate being structured as a half-wave plate and having a principal axis that switches through an angle of rotation $\theta$ substantially equal to $\phi/2$.

2. The light valve of claim 1, in which:
    the switchable half-wave plate has a 0 state and a 1 state; and
    the principal axis of the switchable half-wave plate is substantially parallel to the first direction in the 0 state of the switchable half-wave plate and is at the angle $\theta$ to the first direction in the 1 state of the switchable half-wave plate.

3. The light valve of claim 2, in which:
    the spatial light modulator has a 0 state and a 1 state; and
    the principal axis of the spatial light modulator is substantially parallel to the first direction in the 0 state of the spatial light modulator, and is at the angle $\phi$ to the first direction in the 1 state of the spatial light modulator.

4. The light valve of claim 1, in which:
    the spatial light modulator has a 0 state and a 1 state; and
    the principal axis of the spatial light modulator is substantially parallel to the first direction in the 0 state of the spatial light modulator, and is at the angle $\phi$ to the first direction in the 1 state of the spatial light modulator.

5. The light valve of claim 1, in which the switchable half-wave plate includes:
    a pair of opposed transparent electrodes; and
    a layer of liquid crystal material sandwiched between the electrodes.

6. The light valve of claim 5, in which:
    the liquid crystal material is a ferroelectric liquid crystal material; and
    the light valve additionally comprises a control circuit that generates a control signal having a 0 state and a 1 state corresponding to the 0 state and the 1 state of the switchable half-wave plate, the control signal being connected to the electrodes to generate an electric field between the electrodes, the electric field reversing in direction between the 1 state and the 0 state of the control signal.

7. The light valve of claim 5, in which:
    the liquid crystal material is a nematic liquid crystal material; and
    the light valve additionally comprises a control circuit that generates a control signal having a 0 state and a 1 state corresponding to the 0 state and the 1 state of the switchable half-wave plate, the control signal being connected to the electrodes to generate an electric field between the electrodes, the electric field having a different field strength between the 1 state and the 0 state of the control signal.

8. The light valve of claim 1, in which:
    the switchable half-wave plate includes a plate of electro-optical material; and
    the light valve additionally comprises a control circuit that generates a control signal having a 0 state and a 1 state corresponding to the 0 state and the 1 state of the switchable half-wave plate, the control signal being connected to the electro-optical material to change a birefringent property of the electro-optical material in one of the states of the switchable half-wave plate.

9. The light valve of claim 1, in which the switchable half-wave plate includes:
    a first half-wave plate having a principal axis aligned substantially parallel to the first direction;
    a second half-wave plate having a principal axis aligned at the angle $\theta$ to the first direction; and
    mechanical means for alternately locating the first half-wave plate and the second half-wave plate between the spatial light modulator and the polarizing beam splitter.

10. The light valve of claim 1, in which:
the light valve additionally comprises a control system that generates a first control signal connected to the switchable half-wave plate and a second control signal connected to the spatial light modulator, the first and second control signals each having a 0 state and a 1 state corresponding to the 0 state and the 1 state of the switchable half-wave plate and the spatial light modulator, respectively;
the first control signal has a first period and a second period equal in duration to the first period, and is in one of the states in the first period and the other of the states in the second period; and
the second control signal in one of the states for a portion of the first period, is in the other of the states for a remainder of the first period and for a portion of the second period, equal in duration to the portion of the first period, and is in the one of the states for a remainder of the second period.

11. The light valve of claim 1, in which the switchable half-wave plate is an achromatic switchable half-wave plate.

12. The light valve of claim 11, in which the achromatic switchable half-wave plate includes:
a pair of fixed quarter-wave plates; and
a switchable half-wave plate located between the fixed quarter-wave plates.

13. A method of increasing light throughput of a reflective light valve that requires DC balancing, the method comprising:
providing a reflective light valve including a reflective spatial light modulator and a polarizing beam splitter, the polarizing beam splitter having orthogonal directions of maximum transmissivity and maximum reflectivity, one of the directions defining a direction of polarization of light incident on the reflective spatial light modulator, the other of the directions defining a direction of polarization of light output from the light valve, the spatial light modulator having a principal axis switchable between a first direction and a second direction, the second direction being at an angle $\phi$ to the first direction;
providing a switchable half-wave plate having a principal axis switchable between a third direction and a fourth direction, the fourth direction being at an angle $\theta$ to the third direction;
inserting the switchable half-wave plate into the light valve between the polarizing beam splitter and the reflective spatial light modulator and with the third direction aligned parallel to the first direction;
operating the spatial light modulator in a first time period and a second time period equal to the first time period with the principal axis thereof in the first direction for a first portion of the first time period, switching to the second direction for a remainder of the first time period and a first portion of the second time period, equal in duration to the first portion of the first time period, and returning to the first direction for a remainder of the second time period, the first and second portions of the second time period being in any temporal order;
operating the switchable half-wave plate with the principal axis thereof in the third direction through the first period and in the fourth direction through the second period, and with the angle $\theta$ substantially equal to $\phi/2$.

14. The method of claim 13, in which, in providing the switchable half-wave plate, there is provided a switchable half-wave plate including:
a pair of opposed transparent electrodes; and
a layer of liquid crystal material sandwiched between the electrodes.

15. The method of claim 14, in which:
the liquid crystal material is a ferroelectric liquid crystal material; and
operating the switchable half-wave plate includes:
applying an electric field between the electrodes in a forward direction through the first period, and
applying the electric field between the electrodes in a reverse direction though the second period.

16. The method of claim 14, in which:
the liquid crystal material is a nematic liquid crystal material; and
operating the switchable half-wave plate includes:
applying an electric field between the electrodes through only one of the first period and the second period.

17. The method of claim 13, in which:
in providing the switchable half-wave plate, there is provided a switchable half-wave plate including:
a first fixed half-wave plate having a principal axis in the third direction, and
a second fixed half-wave plate having a principal axis in the fourth direction; and
operating the switchable half-wave plate includes alternately inserting the fixed half-wave plate and the second half-wave plate between the polarizing beam splitter and the reflective spatial light modulator.

18. The method of claim 13, in which, in providing the switchable half-wave plate, an achromatic switchable half-wave plate is provided.

19. The method of claim 13, in which:
in providing the switchable half-wave plate, a switchable half-wave plate is provided in which the principal axis switches between the third direction and the fourth direction in a switching time; and
the method additionally comprises:
illuminating the light valve with light having an intensity; and
reducing the intensity of the light during the switching time of the switchable half-wave plate.

* * * * *